Oct. 17, 1950 — W. L. AIKEN — 2,526,447
BOTTLE WARMER
Filed Aug. 10, 1949 — 2 Sheets-Sheet 1
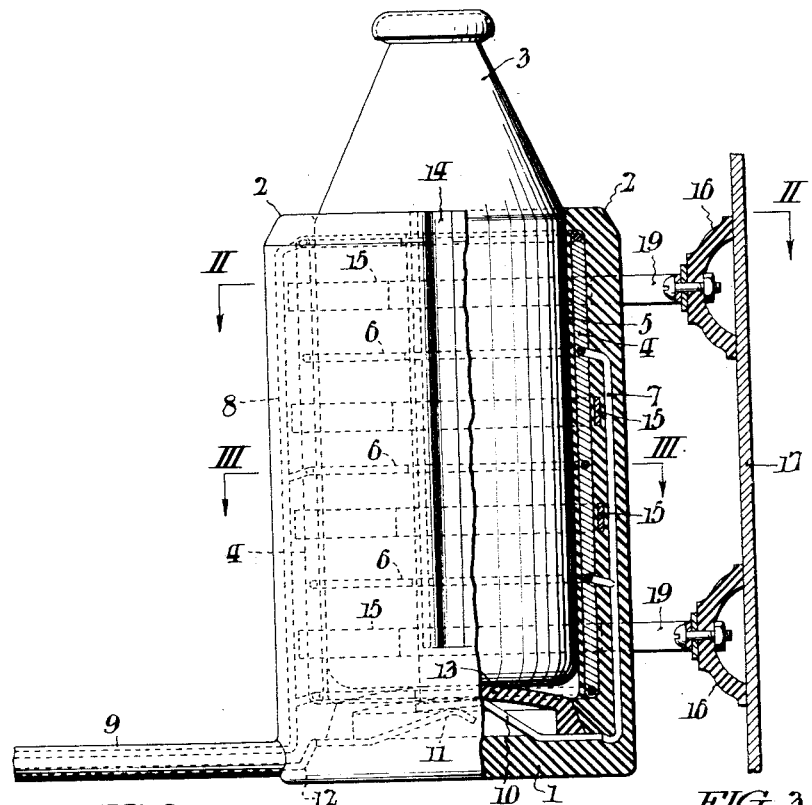
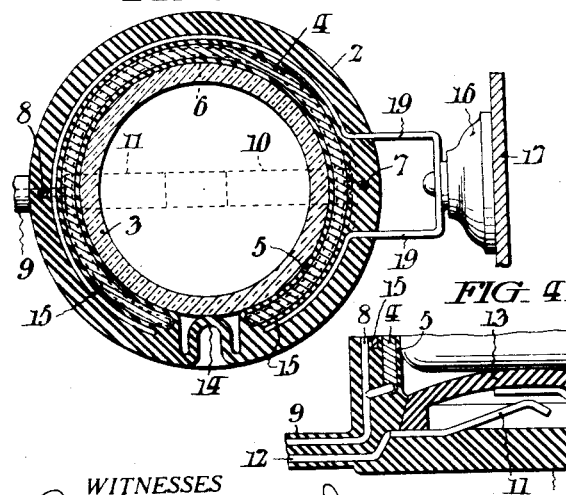
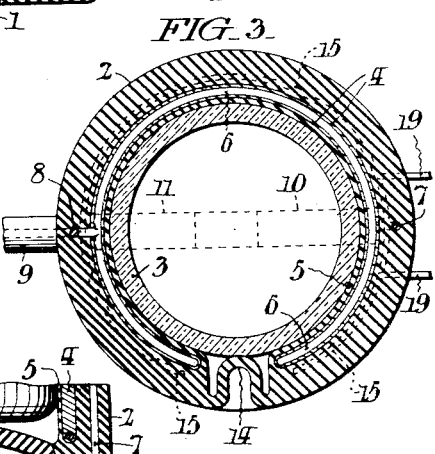
INVENTOR:
William L. Aiken Oct. 17, 1950 W. L. AIKEN 2,526,447
BOTTLE WARMER
Filed Aug. 10, 1949 2 Sheets-Sheet 2
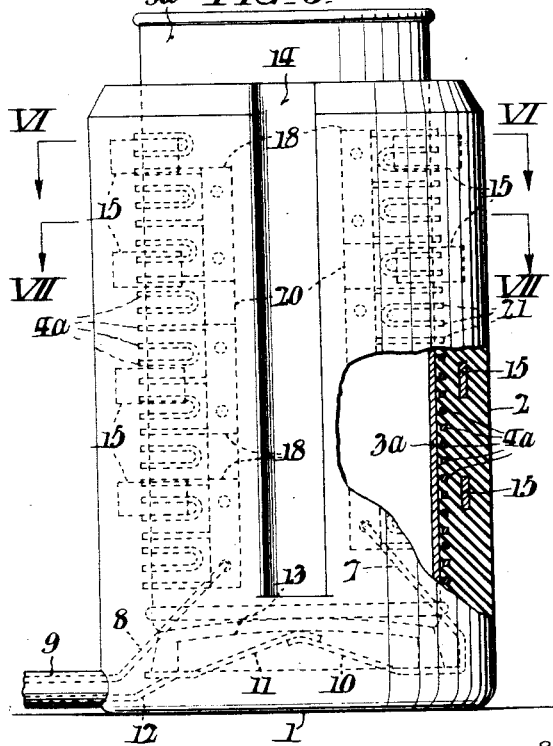
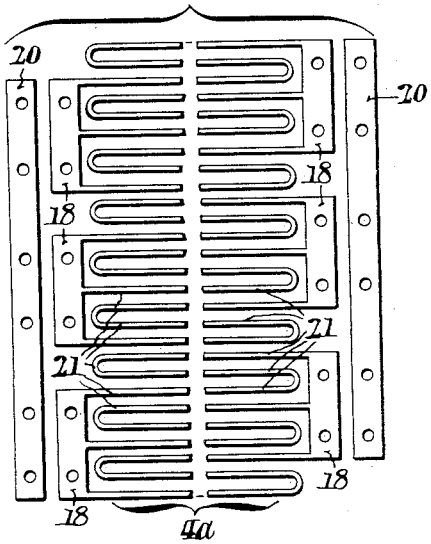
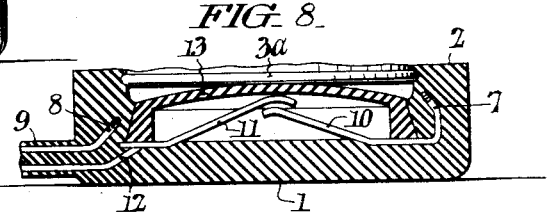
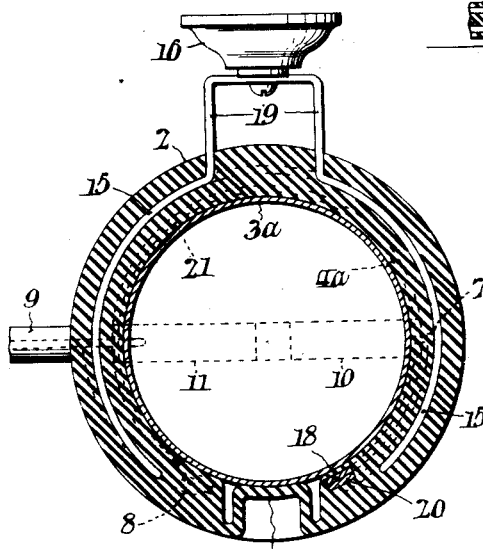
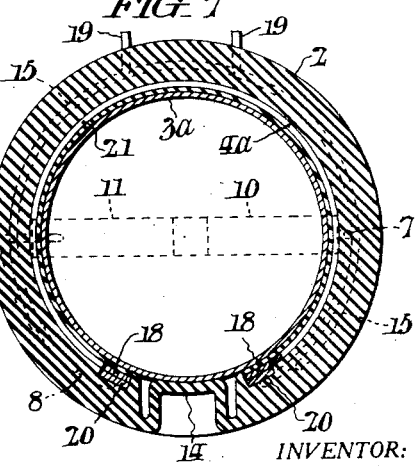
INVENTOR:
William L. Aiken
BY Paul & Paul
ATTORNEYS.

Patented Oct. 17, 1950

2,526,447

UNITED STATES PATENT OFFICE 2,526,447

BOTTLE WARMER

William L. Aiken, Ardmore, Pa.

Application August 10, 1949, Serial No. 109,457

10 Claims. (Cl. 219—43)

This invention relates to a warming container and more particularly to a flexible container for gripping and warming bottles or like articles.

Electric heaters are quite extensively used for warming foods and beverages. Such electric heaters are not only useful in the home, where they may be plugged in to a source of current, but they also have utility in automobiles, airplanes etc. for heating solid and liquid foods in transit. Although considerable effort has been expended in the development of an inexpensive bottle warming container, the devices which are in common use or which have been proposed by prior inventors are relatively complicated, or fragile, or inefficient, and have a tendency to disintegrate with extended severe usage. Moreover, the bottle warming devices of the prior art are structurally inflexible and therefore not well adapted for the accommodation of bottles of varying sizes or for efficient gripping of the bottles, nor are they adapted to be stored in confined spaces, such as the glove compartment of an automobile. The provision of various externally projecting switches, plugs and controls further increases the storage bulk and the overall production cost of such proposed devices.

It is an object of my invention to provide a relatively inexpensive article warming container which is capable of withstanding considerable vibration or rough usage. It is a further object of the invention to provide a flexible article warming container adapted for reception and firm retention of articles of varying sizes and shapes. Another object is to provide a flexible compact article warming container adapted for storage within confined spaces.

Other objects and advantages, including simplicity and economy, and the means by which they are accomplished, will become more apparent from the following description of two specific embodiments of the invention, having reference to the accompanying drawings, whereof:

Fig. 1 is a side elevation of one embodiment of the bottle warming container of this invention, with a portion broken away and shown in section;

Fig. 2 is a horizontal sectional view of the same taken along the lines indicated by arrows II—II of Fig. 1;

Fig. 3 is a horizontal sectional view of the same taken along the lines indicated by arrows III—III in Fig. 1;

Fig. 4 is a fragmentary vertical sectional view of the base portion of the bottle warming container shown in Fig. 1;

Fig. 5 is a side elevation of another embodiment of the invention, with a portion broken away and shown in section;

Fig. 6 is a horizontal sectional view of the same taken along the lines indicated by arrows VI—VI of Fig. 5;

Fig. 7 is a horizontal sectional view of the same taken along the lines indicated by arrows VII—VII of Fig. 5;

Fig. 8 is a fragmentary vertical sectional view of the base portion of the bottle warming container shown in Fig. 5; and Fig. 9 is a development of the heating element broken at the center with terminal connector strips of the article warming container of Fig. 5, shown disconnected therefrom.

In the drawings an example of an article warming container of this invention is illustrated in which the container constitutes a cylindrical receptacle enclosed at the bottom but open at the top, with an electric heating element embedded in its side wall. It will be understood, however, that the invention is applicable for warming objects of a wide variety of shapes, sizes and arrangements and is not limited to the particular constructions selected herein for illustration.

With reference to Figs. 1 to 4 the article warming container comprises a pliable bottom 1 of rubber or rubber-like elastomer and an upstanding cylindrical wall including an intergal outer casing 2, the container being open at the top for reception of a bottle such as indicated at 3. A flexible sheet-like heating element 4 is disposed adjacent to the outer casing 2 and a pliable inner electric-insulating layer 5 is disposed adjacent to the inner surface of the heating element 4. The heating element 4 is insulated electrically on one side by means of the inner insulating layer 5 and on the other side by the outer insulating layer which constitutes the pliable outer casing 2. Inner insulating layer 5 is preferably a soft, porous sheet of rubber or rubber-like elastomer having gripping properties for firm retention of the bottle 3 within the container.

Embedded in the heating element 4 are a plurality of equally spaced parallel electric wires 6. An electric conductor 7 is connected to alternate wires 6 while another electric conductor 8 is connected to the remaining intervening wires 6. Conductor 8 is embedded in the pliable outer casing 2 and in a portion of the base 1, and is led to an external source of electric power (not shown) through a rubber electrical conduit 9 which is integral with the bottom and side wall of the container. Conductor 7 is similarly embedded in the outer casing 2 and bottom 1 of the container and is connected electrically to switch contact 10 the lower end of which is enclosed in the base 1. Switch contact 11 is also enclosed in the base 1 of the article warming container in contact with conductor 12 which is similarly embedded in the outer casing and in conduit 9 for connection to a source of electric power. The parallel connecting wires may be more or less in number depending upon the voltage for which the device is intended to operate, upon the electrical characteristics of the material comprising the heating element and upon the desired power consumption of the device.

A flexible rubber cap 13 is tightly fitted in the container above the switch contacts 10, 11 and is so formed as to prevent moisture, such as moisture present on the outer surface of a bottle, from coming into contact with the switch elements 10, 11. A substantially watertight fitting is attained by providing an annular depending shoulder on the collapsible cap 13 and an accommodating recess therefor in the wall of the container. The cap 13 has a shouldered fit with the sides of the casing above the switch, as appears in Figs. 1 and 4 and may, if desired, be cemented at its periphery. Switch contacts 10, 11 extend upwardly from the floor of the base 1, contact 10 being normally above and spaced from contact 11 when the container is not in use. The insertion of an article, such as bottle 3, accompanied by a manual downward thrust forces switch contact 10 downwardly into electrical connection with contact 11. The bottle is securely held in position by the contractive force exerted by the resilient warming container against the surface of the bottle, thereby holding the switch closed until the bottle is removed. Contacts 10 and 11 are desirably constructed of rigid metal parts. The inherent elasticity of the rubber outer casing 2 and cap 13 permits the downward deflection of the cap and the free end of contact 10 incident to the insertion of a bottle 3 in the container, and similarly causes their upward return to their original positions after removal of the bottle.

As shown in Figs. 2 and 3, the container wall is divided longitudinally into two halves which are joined at the line of division by expansion joint 14 in the form of an elastic bend. The elasticity of the bend facilitates gripping of the article within the container and permits the accommodation of articles of varying sizes and shapes. Spring clamps 15 are employed which are preferably embedded in the wall of the container at convenient intervals and tend to contract the two halves. The spring clamps coact with the elastic expansion joint 14 and the pliable wall elements to provide a substantial variation in the diameter of the wall and hence adapt the container to receive and accommodate various sizes of bottles, while insuring heat conductive contact between the inner surface of the warming container and the article being heated. The uppermost and lowermost of the spring clamps 15 have outward extensions 19 which project from the casing to form a means for supporting the container. Vacuum cups 16 are affixed to the extensions 19 for attachment to an external supporting surface 17. The container may be conveniently attached to a vertical supporting surface 17 merely by pressing the vacuum cups against the same.

The pliable heating element 4 is preferably a flexible elastic electric conductor, by which is meant a material adapted to undergo a considerable deformation under stress and to regain its original dimensions when the stress is removed. Various types of electrically conductive rubber-like materials which contain electrically conductive particles or are otherwise compounded in order to attain adequate electric conductivity are particularly effective in constructing an article warming container according to this invention and to improve the flexibility and elasticity of the container. A particularly desirable flexible elastic conductor is commercially known as "Pliotherm," which is an elastomeric material properly compounded for conducting electricity for transformation into thermal energy. The resistance of a centimeter cube of "Pliotherm" is about one to two ohms, measured between two opposite faces of the cube. "Pliotherm" has a tensile strength of 1500–2000 pounds per square inch, an elongation of 200–350%, and a Shore hardness "A" of 70–85.

A further embodiment of my invention is shown in Figs. 5 to 9. In this embodiment, the container comprises a rubber bottom 1, and a cylindrical rubber side wall 2, and is open at the top for the reception of can 3a. A flexible heating element 4a of nichrome or other resistance material is embedded in the side wall 2 of the container. The heating element 4a is thus interposed between an inner layer and an outer layer of elastic insulating material, the inner layer being relatively thin for the attainment of electric insulation without substantially obstructing the flow of heat to the article to be warmed. The flexible nichrome heating element 4a comprises a plurality of nichrome terminals 18 which are connected by a plurality of passes of strip nichrome. The terminals 18 are connected electrically in parallel by terminal connector strips 20. Each pass is arranged to travel a tortuous course from terminal to terminal and is easily deformed in various directions, forming a pliable heating element in combination with the terminals. Terminal connector strips 20 are embedded in the casing of the container in electrical contact with each of the terminals 18, and electrical conductors 7 and 8 are connected to the terminal connector strips 20. Conductor 7 is adapted for connection to a source of electric power through switch contacts 10 and 11 and conduit 9, the entire switch mechanism including flexible rubber cap 13 being the same as previously described in relation to Figs. 1 to 4 herein. The container is also preferably provided with an expansion bend 14 and spring clamps 15 as previously described.

The expansion bend 14 is shown in a partially expanded position in Figs. 5, 6 and 7. While can 3a has a greater diameter than the normal inside diameter of the container when empty, the heating surface of the container is adapted to expand and to receive and grip the oversize article while contacting substantially the entire heat receiving surface of the article.

With reference to Fig. 9, the pliable heating element is a sheet metal structure having a plurality of opposed terminals 18 and a plurality of tortuous passes of sheet metal 21. Each pass 21 comprises a series of parallel conductors connected at alternate ends to form a plurality of U-shaped sections in series.

A desirable nichrome heating element in a bottle warming container particularly adapted for connection to a 7 volt battery is manufactured by stamping the passes 4a and terminals 18 from a rectangular nichrome sheet 0.00406 inch thick, 7.2 inches long and 1.114 inches wide. Each pass has three straight parallel conductors approximately 6.2 inches long thereby attaining a total length of nichrome strip per pass of about 19.3 inches. The heating element consists of nine complete passes which are connected in parallel, the total resistance of the heating element being 0.466 ohm. The heater consumes 105 watts and draws a direct current of 15 amperes at 7 volts. The heating element measures 3.508 inches from top to bottom. The physical dimensions of the conductors in the heating element may be varied as required to suit the voltage for which the device is intended to operate, the electrical characteristics of the resistance material and the desired power consumption of the device.

While I have shown and described two preferred embodiments of my invention, it is to be understood that my invention is not limited to the particular structural details set forth or to heating commodities contained in bottles or cans alone. The article warming container may have a non-circular cross section for heating articles of corresponding shape and may be suitably provided with an open bottom or may be provided with removable covers for the top or bottom of the container. It will further be appreciated that spring members 15 and the entire switch mechanism are preferred but not essential features of the invention and that switch contacts 10 and 11 may be rigid metal or spring metal structures. The heating elements shown and described herein are subjects to considerable modification within the spirit of the invention, such as the substitution of other electric conductors for nichrome and the replacement of the tortuous passes of strip metal with strands of wire or other conductor suitably arranged for construction of a flexible heating element. It will further be appreciated that while the provision of spring clamps 15 is highly desirable particularly in combination with the concealed electric switch, the omission of clamps 15 in the construction of a flexible bottle warming container enhances its overall flexibility for purposes of storage. It will also be apparent that numerous modifications and substitutions other than the ones specifically mentioned herein may be made in the construction of the article warming container and that other features of the invention may be used to advantage independently of the other features, all within the spirit of the invention as defined in the appended claims.

Having thus described my invention, I claim:

1. A warming container having a wall enclosing a space for reception of an article to be warmed, said wall comprising inner and outer layers of an elastic electric-insulating material with a flexible heating element interposed between the layers, and said wall being divided longitudinally and provided at the line of division with an expansion joint whereby said wall is adapted to grip flexibly the article enclosed thereby, and electrical conductors connected to the flexible heating element and adapted for connection to an external source of power.

2. A warming container having a wall enclosing a space for reception of an article to be warmed, said wall comprising inner and outer layers of an elastic electric-insulating material with a flexible heating element interposed between said layers, and said wall being divided longitudinally and provided at the line of division with an expansion joint, and a spring clamp engaging said wall and tending to contract the divided sections thereof thereby causing them to grip flexibly the article to be warmed.

3. A warming container having a base and an upstanding wall enclosing a space for reception of an article to be warmed, said wall being composed of an elastic material having a flexible heating element embedded therein and constructed to expand and contract circumferentially to grip under pressure the article to be warmed and electric switch elements in circuit with said heating element and wholly disposed within said base, said base including a flexible cap covering said switch and adapted to be compressed by the insertion of the article within the container with incidental closure of the switch elements and energization of the heating element, said switch elements being held in closed position by the pressure grip of the elastic wall on the article to be warmed, and said cap being adapted to be expanded by the removal of the article from the container with incidental opening of the switch elements and de-energization of the heating element.

4. A warming container having a closed base and an upstanding wall, and open at the top, said wall comprising an elastic outer casing having a flexible heating element disposed adjacent to the inner surface of the outer casing, a pliable inner layer of an electric-insulating material disposed adjacent to the inner surface of the heating element, said wall being constructed to expand and contract circumferentially thereby gripping under pressure the article to be warmed, electric switch elements in circuit with said heating element and wholly enclosed within said base, said base including a flexible cap covering said switch and adapted to be compressed by the insertion of the article within the container with incidental closure of the switch elements and energization of the heating element and to be held in compressed position by the gripping action of the elastic casing on the article, and said cap being adapted to be expanded by the removal of the article from the container with incidental opening of the switch elements and de-energization of the heating element.

5. A bottle warming container having a base and an upstanding wall, and open at the top, said wall comprising an outer elastic casing, a flexible electric heating element disposed adjacent to the inner surface of said casing, a pliable inner layer of an electric insulating material disposed adjacent to the inner surface of said heating element, electrical conductors connected to said heating element for the passage of current therethrough, said conductors being embedded in said outer casing and adapted for connection to a source of electric power, an elastic expansion joint disposed longitudinally in said wall, and a spring clamp engaging the wall and coacting with the expansion joint for adapting the warming container to receive and grip bottles of varying sizes while insuring heat conductive contact therewith.

6. A warming container having a closed base and an upstanding wall enclosing a space for reception of the article to be warmed, and open at the top, said wall comprising an elastic outer casing having a flexible heating element disposed adjacent to the inner surface of the outer casing, a pliable inner layer of an elastic electric-insulating material disposed adjacent to the inner surface of the heating element, said wall being constructed to expand and contract circumferentially thereby gripping under pressure the article to be warmed, electric switch elements in circuit with said heating element and wholly enclosed within said base, said base including a flexible cap having a shouldered fit with the upstanding wall, said cap covering said switch and adapted to be compressed by the insertion of the article within the container with incidental closure of the switch elements and energization of the heating element, and to be held in closed position by the gripping action of the elastic casing on the article, and said cap being adapted to be expanded by the removal of the article from the container with incidental opening of the switch elements and de-energization of the heating element.

7. An article warming container having an enclosed base, a wall consisting of inner and outer layers of elastic electric-insulating material and an intermediate layer of an elastic electric conducting material in the form of a substantially continuous sheet, said elastic electric-conducting material having an elongative capacity on the order of 200% or above, and said wall consisting only of elastic layers and enclosing from all sides a space for the article to be heated, and separate electrical conductors imbedded in the sheet of elastic electric conducting material and adapted for connection to an external source of electric energy, whereby an electric current from said source flows through the conductors and through the layer of elastic electric-conducting material to raise the temperature of the elastic electric-conducting material and to heat by conduction the article enclosed by said wall.

8. A flexible elastic warming container for articles such as bottles and the like, comprising a bottom, an upstanding wall attached to said bottom, and an open top, said upstanding wall defining a space for reception of the bottle to be warmed and completely enclosing said space from the sides, said wall consisting solely of elastic yieldable layers including inner and outer layers of yieldable elastic electric-insulating material and an intermediate layer of elastic electric conducting material in the form of a substantially continuous sheet having capacity to elongate and contract, the entire wall having capacity to stretch and contract circumferentially to receive and yieldably grip a bottle inserted into said space and to effect pressure contact between the wall and the bottle, and electrical conductors connected to the heating element and adapted for connection to an external source of power.

9. A flexible warming container for articles such as bottles and the like, having a wall enclosing a space for reception of the article to be warmed, said wall comprising inner and outer layers of an elastic electric-insulating material with a flexible heating element interposed between the layers, and said wall being divided along a line extending from one end to a point adjacent the other end and provided at the line of division with an expansion joint whereby said wall is adapted to grip flexibly the article enclosed thereby, and electrical conductors connected to the flexible heating element and adapted for connection to an external source of power.

10. The invention as defined in claim 9, in combination with a spring clamp engaging said wall and tending to contract the divided sections thereof, thereby causing them to grip flexibly the article to be warmed.

WILLIAM L. AIKEN.

REFERENCES CITED

The following references are of record in the file of this patent:

UNITED STATES PATENTS

| Number | Name | Date |
|---|---|---|
| 1,455,287 | Hadley | May 15, 1923 |
| 1,979,222 | Goodwin | Oct. 30, 1934 |
| 1,992,593 | Whitney | Feb. 26, 1935 |
| 2,052,644 | Murphy | Sept. 1, 1936 |
| 2,120,301 | Tishman | June 14, 1938 |
| 2,255,376 | Bull et al. | Sept. 9, 1941 |
| 2,343,060 | Horning | Feb. 29, 1944 |
| 2,385,577 | Jacob | Sept. 25, 1945 |
| 2,404,736 | Marick | July 23, 1946 |
| 2,475,404 | Reed | July 5, 1949 |